United States Patent
Catreux et al.

(10) Patent No.: US 7,983,355 B2
(45) Date of Patent: Jul. 19, 2011

(54) SYSTEM AND METHOD FOR RF SIGNAL COMBINING AND ADAPTIVE BIT LOADING FOR DATA RATE MAXIMIZATION IN MULTI-ANTENNA COMMUNICATION SYSTEMS

(75) Inventors: Severine Catreux, Cardiff, CA (US); Vinko Erceg, Cardiff, CA (US); Pieter Roux, San Diego, CA (US); Pieter Van Rooyen, San Diego, CA (US); Jack Winters, Middletown, NJ (US)

(73) Assignee: Broadcom Corporation

( * ) Notice: Subject to any disclaimer, the term of this patent is extended or adjusted under 35 U.S.C. 154(b) by 1259 days.

(21) Appl. No.: 10/886,510

(22) Filed: Jul. 7, 2004

(65) Prior Publication Data

US 2005/0053164 A1    Mar. 10, 2005

Related U.S. Application Data

(60) Provisional application No. 60/485,915, filed on Jul. 9, 2003, provisional application No. 60/491,128, filed on Jul. 29, 2003.

(51) Int. Cl.
*H04L 27/00* (2006.01)
*H04L 25/03* (2006.01)
*H04B 1/00* (2006.01)

(52) U.S. Cl. .......... 375/295; 375/296; 375/316; 455/45; 455/500; 455/702; 455/703

(58) Field of Classification Search .................. 375/295, 375/296, 316; 455/39, 42, 45, 500, 517, 455/522, 60, 702, 703, 71
See application file for complete search history.

(56) References Cited

U.S. PATENT DOCUMENTS

| | | | |
|---|---|---|---|
| 5,345,599 A | | 9/1994 | Paulraj et al. |
| 5,625,880 A | | 4/1997 | Goldburg et al. |
| 5,642,353 A | | 6/1997 | Roy, III et al. |
| 5,719,583 A | | 2/1998 | Kanai |
| 5,809,422 A | | 9/1998 | Raleigh et al. |
| 5,822,312 A | | 10/1998 | Peach et al. |
| 5,834,972 A | | 11/1998 | Schiemenz et al. |
| 5,949,833 A | * | 9/1999 | Weerackody .......... 375/347 |
| 5,991,273 A | | 11/1999 | Abu-Dayya |

(Continued)

OTHER PUBLICATIONS

Hunt Engineering modular signal processing systems, "Digital Down Conversion (DDC)", pp. 1-7, 1997-2010.*

*Primary Examiner* — David C Payne
*Assistant Examiner* — Linda Wong
(74) *Attorney, Agent, or Firm* — McAndrews, Held & Malloy, Ltd.

(57) ABSTRACT

A system and method for generating weight values based on maximum data rate for weighting elements included within signal weighting and combining arrangements used in various multi-antenna transmitter and receiver structures is disclosed herein. Weighting values for a given signal combining arrangement are set so as to maximize an output data rate of the applicable multi-antenna system in the presence of adaptive bit loading of the subcarriers of a transmitted signal. The disclosed techniques may be employed to maximize a data rate of a multi-antenna communication system by using adaptive bit loading and RF and baseband weighting schemes. In this case a search is conducted over various combinations of RF and baseband weights in order to find the weight combination which, when adaptive bit loading is also employed, maximizes the data rate.

29 Claims, 4 Drawing Sheets

U.S. PATENT DOCUMENTS

| | | | |
|---|---|---|---|
| 6,016,124 A | 1/2000 | Lo et al. | |
| 6,115,409 A | 9/2000 | Upadhyay et al. | |
| 6,144,711 A | 11/2000 | Raleigh et al. | |
| 6,192,256 B1 | 2/2001 | Whinnett | |
| 6,240,098 B1 | 5/2001 | Thibault et al. | |
| 6,373,433 B1 | 4/2002 | Espax et al. | |
| 6,400,318 B1 | 6/2002 | Kasami et al. | |
| 6,452,981 B1 | 9/2002 | Raleigh et al. | |
| 6,590,532 B1 | 7/2003 | Ogawa et al. | |
| 6,618,454 B1 | 9/2003 | Agrawal et al. | |
| 6,628,969 B1 | 9/2003 | Rilling | |
| 6,665,335 B1* | 12/2003 | Rajagopal et al. | 375/224 |
| 6,697,017 B1 | 2/2004 | Shmuel | |
| 6,721,339 B2 | 4/2004 | Li et al. | |
| 6,765,969 B1 | 7/2004 | Vook et al. | |
| 6,771,706 B2 | 8/2004 | Ling et al. | |
| 6,778,612 B1 | 8/2004 | Lozano et al. | |
| 6,785,520 B2 | 8/2004 | Sugar et al. | |
| 6,804,216 B1 | 10/2004 | Kuwahara et al. | |
| 6,873,651 B2 | 3/2005 | Tesfai et al. | |
| 6,882,678 B2 | 4/2005 | Kong et al. | |
| 6,888,809 B1 | 5/2005 | Foschini et al. | |
| 6,891,516 B1 | 5/2005 | Saunders et al. | |
| 6,968,022 B1 | 11/2005 | Poor et al. | |
| 6,985,434 B2* | 1/2006 | Wu et al. | 370/208 |
| 7,020,110 B2 | 3/2006 | Walton et al. | |
| 7,024,166 B2 | 4/2006 | Wallace et al. | |
| 7,072,413 B2 | 7/2006 | Walton et al. | |
| 7,076,168 B1* | 7/2006 | Shattil | 398/76 |
| 7,079,867 B2 | 7/2006 | Chun et al. | |
| 7,110,468 B2 | 9/2006 | Kohno et al. | |
| 7,177,369 B2 | 2/2007 | Crilly, Jr. | |
| 7,230,931 B2 | 6/2007 | Struhsaker | |
| 7,236,478 B2* | 6/2007 | Wu et al. | 370/334 |
| 7,236,537 B2 | 6/2007 | Hottinen et al. | |
| 7,248,656 B2 | 7/2007 | da Silveira et al. | |
| 7,327,800 B2* | 2/2008 | Oprea et al. | 370/203 |
| 7,515,714 B2* | 4/2009 | Orihashi et al. | 380/255 |
| 7,522,673 B2* | 4/2009 | Giannakis et al. | 375/267 |
| 7,535,969 B2 | 5/2009 | Catreux | |
| 7,538,274 B2 | 5/2009 | Catreux | |
| 7,822,140 B2 | 10/2010 | Catreux | |
| 7,869,537 B2 | 1/2011 | Catreux | |
| 2001/0038356 A1* | 11/2001 | Frank | 343/853 |
| 2002/0094019 A1* | 7/2002 | Mesecher | 375/147 |
| 2002/0126042 A1 | 9/2002 | Chang et al. | |
| 2003/0017852 A1* | 1/2003 | Miyatani | 455/562 |
| 2003/0043929 A1 | 3/2003 | Sampath | |
| 2003/0045313 A1 | 3/2003 | Iwamatsu et al. | |
| 2003/0048856 A1 | 3/2003 | Ketchum et al. | |
| 2003/0198284 A1* | 10/2003 | Mesecher et al. | 375/147 |
| 2003/0231547 A1 | 12/2003 | Yang | |
| 2003/0231606 A1* | 12/2003 | Wu et al. | 370/334 |
| 2004/0095907 A1 | 5/2004 | Agee et al. | |
| 2004/0165558 A1 | 8/2004 | Ling et al. | |
| 2004/0178954 A1* | 9/2004 | Vook et al. | 342/383 |
| 2004/0184398 A1* | 9/2004 | Walton et al. | 370/203 |
| 2004/0192218 A1 | 9/2004 | Oprea | |
| 2004/0208258 A1 | 10/2004 | Lozano et al. | |
| 2004/0266485 A1 | 12/2004 | Paramesh et al. | |
| 2005/0032497 A1 | 2/2005 | Girardeau et al. | |
| 2006/0104197 A1 | 5/2006 | Proctor et al. | |
| 2006/0135101 A1 | 6/2006 | Binshtok et al. | |
| 2009/0233567 A1 | 9/2009 | Catreux et al. | |

* cited by examiner

SYSTEM AND METHOD FOR RF SIGNAL COMBINING AND ADAPTIVE BIT LOADING FOR DATA RATE MAXIMIZATION IN MULTI-ANTENNA COMMUNICATION SYSTEMS

CROSS-REFERENCE TO RELATED APPLICATIONS

This application claims priority under 35 U.S.C. §119(e) to U.S. provisional application Ser. No. 60/485,915, entitled SYSTEM AND METHOD FOR RF SIGNAL COMBINING AND ADAPTIVE BIT LOADING FOR DATA RATE MAXIMIZATION IN MULTI-ANTENNA COMMUNICATION SYSTEMS, filed Jul. 9, 2003, which is herein incorporated by reference in its entirety. This application is also related to copending U.S. non-provisional application Ser. No. 10/801,930, entitled MULTI-ANTENNA COMMUNICATION SYSTEMS UTILIZING RF-BASED AND BASEBAND SIGNAL WEIGHTING AND COMBINING, filed Mar. 16, 2004, to copending U.S. non-provisional application Ser. No. 10/835,255, entitled WEIGHT GENERATION METHOD FOR RF SIGNAL COMBINING IN MULTI-ANTENNA COMMUNICATION SYSTEMS, and to copending U.S. provisional application Ser. No. 60/491,128, entitled FREQUENCY SELECTIVE TRANSMIT SIGNAL WEIGHTING FOR MULTIPLE ANTENNA SYSTEMS, filed Jul. 29, 2003, all of which are assigned to the assignee of the present application.

FIELD OF THE INVENTION

The present invention relates to communication systems utilizing transmitters and receivers having multiple antenna elements. More particularly, the present invention relates to a data rate maximization scheme using adaptive bit loading and RF-based signal weighting and combining, either exclusively or in combination with baseband signal weighting and combining, in connection with transmission and reception of signals using multi-antenna transmitters and receivers.

BACKGROUND OF THE INVENTION

Most current wireless communication systems are composed of nodes configured with a single transmit and receive antenna. However, for a wide range of wireless communication systems, it has been predicted that the performance, including capacity, may be substantially improved through the use of multiple transmit and/or multiple receive antennas. Such configurations form the basis of many so-called "smart" antenna techniques. Such techniques, coupled with space-time signal processing, can be utilized both to combat the deleterious effects of multipath fading of a desired incoming signal and to suppress interfering signals. In this way both the performance and capacity of digital wireless systems in existence or being deployed (e.g., CDMA-based systems, TDMA-based systems, WLAN systems, and OFDM-based systems such as IEEE 802.11a/g) may be improved.

The impairments to the performance of wireless systems of the type described above may be at least partially ameliorated by using multi-element antenna systems designed to introduce a diversity gain and suppress interference within the signal reception process. This has been described, for example, in "The Impact of Antenna Diversity On the Capacity of Wireless Communication Systems", by J. H. Winters et al, IEEE Transactions on Communications, vol. 42, No. 2/3/4, pages 1740-1751, February 1994. Such diversity gains improve system performance by mitigating multipath for more uniform coverage, increasing received signal-to-noise ratio (SNR) for greater range or reduced required transmit power, and providing more robustness against interference or permitting greater frequency reuse for higher capacity.

Within communication systems incorporating multi-antenna receivers, it is known that a set of M receive antennas are capable of nulling up to M−1 interferers. Accordingly, N signals may be simultaneously transmitted in the same bandwidth using N transmit antennas, with the transmitted signal then being separated into N respective signals by way of a set of N antennas deployed at the receiver. Systems of this type are generally referred to as multiple-input-multiple-output (MIMO) systems, and have been studied extensively. See, for example, "Optimum combining for indoor radio systems with multiple users," by J. H. Winters, IEEE Transactions on Communications, Vol. COM-35, No. 11, November 1987; "Capacity of Multi-Antenna Array Systems In Indoor Wireless Environment" by C. Chuah et al, Proceedings of Globecom '98 Sydney, Australia, IEEE 1998, pages 1894-1899 November 1998; and "Fading Correlation and Its Effect on the Capacity of Multi-Element Antenna Systems" by D. Shiu et al, IEEE Transactions on Communications vol. 48, No. 3, pages 502-513 March 2000.

One aspect of the attractiveness of multi-element antenna arrangements, particularly MIMOs, resides in the significant system capacity enhancements that can be achieved using these configurations. Under the assumption of perfect estimates of the applicable channel at the receiver, in a MIMO system with N transmit and N receive antenna elements, the received signal decomposes to N "spatially-multiplexed" independent channels. This results in an N-fold capacity increase relative to single-antenna systems. For a fixed overall transmitted power, the capacity offered by MIMOs scales linearly with the number of antenna elements. Specifically, it has been shown that with N transmit and N receive antennas an N-fold increase in the data rate over a single antenna system can be achieved without any increase in the total bandwidth or total transmit power. See, e.g., "On Limits of Wireless Communications in a Fading Environment When Using Multiple Antennas", by G. J. Foschini et al, Wireless Personal Communications, Kluwer Academic Publishers, vol. 6, No. 3, pages 311-335, March 1998. In experimental MIMO systems predicated upon N-fold spatial multiplexing, more than N antennas are often deployed at a given transmitter or receiver. This is because each additional antenna adds to the diversity gain and antenna gain and interference suppression applicable to all N spatially-multiplexed signals. See, e.g., "Simplified processing for high spectral efficiency wireless communication employing multi-element arrays", by G. J. Foschini, et al, IEEE Journal on Selected Areas in Communications, Volume: 17 Issue: 11, November 1999, pages 1841-1852.

Although increasing the number of transmit and/or receive antennas enhances various aspects of the performance of MIMO systems, the necessity of providing a separate RF chain for each transmit and receive antenna increases costs. Each RF chain is generally comprised of a low noise amplifier, filter, downconverter, and analog to digital to converter (A/D), with the latter three devices typically being responsible for most of the cost of the RF chain. In certain existing single-antenna wireless receivers, the single required RF chain may account for in excess of 30% of the receiver's total cost. It is thus apparent that as the number of transmit and receive antennas increases, overall system cost and power consumption may dramatically increase. It would therefore be desirable to provide a technique for utilizing relatively larger numbers of transmit/receive antennas without proportionately increasing system costs and power consumption.

The above-referenced copending non-provisional application Ser. No. 10/801,930 provides such a technique by describing a wireless communication system in which it is possible to use a smaller number of RF chains within a transmitter and/or receiver than the number of transmit/receiver antennas utilized. In the case of an exemplary receiver implementation, the signal provided by each of M (M>N) antennas is passed through a low noise amplifier and then split, weighted and combined in the RF domain with the signals from the other antennas of the receiver. This forms N RF output signals, which are then passed through N RF chains. The output signals produced by an A/D converter of each RF chain are then digitally processed to generate the N spatially-multiplexed output signals. By performing the requisite weighting and combining at RF using relatively inexpensive components, an N-fold spatially-multiplexed system having more than N receive antennas, but only N RF chains, can be realized at a cost similar to that of a system having N receive antennas. That is, receiver performance may be improved through use of additional antennas at relatively low cost. A similar technique can be used within exemplary transmitter implementations incorporating N RF chains and more than N transmit antennas.

The RF-based weighting techniques described in the above-referenced '930 non-provisional application advantageously enable the same type of combining of spatially weighted signals to be performed in the RF domain as is done at baseband. One advantage of these techniques is that RF weighting and combining may be performed using only N transmit and N receive RF chains, independent of the number of transmit and receive antennas. Furthermore, notwithstanding the fact that the '930 application describes RF-based weighting and combining, it remains possible to implement the digital signal processing schemes prior to conversion to analog/RF within the transmitter and subsequent to conversion to digital from analog/RF within the receiver. Such techniques may include successive interference cancellation in the case of MIMO systems (see, e.g., "V-BLAST: An architecture for realizing very high data rates over the rich-scattering wireless channel," in Proceedings of URSI ISSSE, September, 1998, pp. 295-300).

Although the techniques described in the '930 non-provisional application may not offer performance identical to baseband techniques in the case of temporal and/or frequency domain signal processing, it may still be preferable to employ such techniques as a result of the lower costs involved. Frequency domain processing is used in systems in which, for example, the transmitted signal consists of a number of frequency subcarriers. This type of signal processing is required to be performed when implementing systems based upon orthogonal frequency division multiplexing (OFDM), such as the wireless local area network systems popularly referred to simply as "802.11(a)" and "802.11(g)". Alternatively, for the same or lower cost as is required by conventional approaches, the techniques of the '930 application may be employed to enable the use of a greater number of antennas, which may result in substantially superior performance relative to such conventional approaches.

In the above-referenced copending non-provisional application Ser. No. 10/835,255, techniques for generating RF-based weighting values designed to maximize an output signal-to-noise ratio of the receiver averaged over the applicable channel were presented. Although this performance measure may be suitable for application in systems in which frequency domain processing involves the use of the same modulation and coding for each subcarrier (e.g., in 802.11(a) systems), in many cases overall data rate may be increased by varying the modulation and coding employed among the various subcarriers. When such frequency domain processing is performed at baseband, it is known that the output data rate may be maximized by adaptive bit loading; see, e.g., "Adaptive bit loading for wireless OFDM systems," A. N. Barreto and S. Furrer, *International Symposium on Personal, Indoor and Mobile Radio Communications,* 2001, September/October 2001, pages G-88-92, vol. 2. Consistent with the adaptive bit loading technique, the power at which each subcarrier is transmitted is scaled based on the channel gain (while maintaining the aggregate transmitted power constant) and the data rate in each subcarrier is adjusted to the maximum value attainable in view of a given performance measure characterizing the receiver (e.g., bit error rate). The set of baseband spatial weights associated with each subcarrier that are used during baseband processing computations are calculated independently of the bit loading parameters using closed-form expressions. Once these baseband spatial weights have been determined, calculation of adaptive bit loading parameters applicable to each transmitted subcarrier is then separately performed. See, e.g., "On implementation of bit-loading algorithms for OFDM systems with multiple-input multiple-output", J. Gao and M. Faulkner, *Proceedings of the IEEE Vehicular Technology Conference,* 2002-Fall, pages 199-203, vol. 1.

Unfortunately, methods of calculating spatial weighting values independently of the bit loading parameters using closed-form expressions of the type described above are inapplicable to the cases described in the above-referenced copending non-provisional patent applications; that is, in cases in which signal weighting is performed exclusively in the RF domain or within both the RF and baseband domains.

SUMMARY OF THE INVENTION

The present invention is directed to a system and method for generating weight values based on maximum data rate for weighting elements included within the signal weighting and combining arrangements used in various multi-antenna transmitter and receiver structures. Specifically, the present invention may be applied to RF-based weighting and combining arrangements within multi-antenna transmitter and receiver structures disposed to process one or more information signals modulated upon respective pluralities of subcarrier signals. The present invention may also find application when both RF-based and baseband weighting and combining arrangements are incorporated within the same multi-antenna transmitter or receiver structure.

Consistent with the invention, the weighting values for a given signal combining arrangement are set so as to maximize an output data rate of the applicable multi-antenna system in the presence of adaptive bit loading of the subcarriers of a transmitted signal. The inventive weight generation method may be employed within several different types of multi-antenna communication systems including, for example, those described within the above-referenced copending non-provisional applications. In particular embodiments the inventive technique may be applied to a multi-antenna receiver within a "single channel" (SC) system (i.e., a system lacking spatial multiplexing), to a multi-antenna transmitter in a single channel system, or to the transmitter or receiver of a MIMO system employing spatial multiplexing.

As is described herein, the present invention may be employed to maximize a data rate of a multi-antenna communication system by using adaptive bit loading and RF and baseband weighting schemes. In this case a search is conducted over various combinations of RF and baseband weights in order to find the weight combination which, when adaptive bit loading is also employed, maximizes the data rate. This search may be performed globally or by using techniques such as simulated annealing.

In one aspect the present invention relates to an RF processing method practiced within a multi-antenna transmitter. In operation, the transmitter is disposed to transmit an RF input signal comprised of a plurality of subcarrier signals through a plurality of transmit antennas, thereby producing a corresponding plurality of RF output signals. The method includes adaptively bit loading the plurality of subcarrier signals in accordance with a corresponding plurality of bit loading values in order to form a corresponding plurality of bit-loaded subcarrier signals. The plurality of bit-loaded subcarrier signals are then converted into the RF input signal. The method further includes dividing the RF input signal in order to form a plurality of divided RF signals, which are then weighted in accordance with a corresponding plurality of transmit RF weighting values in order to form the plurality of RF output signals. Consistent with this aspect of the invention, the plurality of transmit RF weighting values and the plurality of bit loading values are selected so as to maximize an output data rate of the transmitter.

The invention is also directed to a signal weighting and combining method designed to be implemented within a receiver having a plurality of receive antennas disposed to produce a corresponding plurality of received RF signals. During operation of the receiver, the plurality of received RF signals are generated in response to a transmitted RF signal comprised of a plurality of subcarrier signals. The method includes weighting the plurality of received RF signals in accordance with a corresponding plurality of RF weighting values thereby forming a plurality of weighted RF signals. In this regard the RF weighting values are selected, and the plurality of subcarrier signals are bit-loaded, so as to maximize an output data rate. The method further includes combining ones of the plurality of weighted RF signals in order to form one or more combined RF signals.

In another aspect the invention pertains to an RF signal processing method capable of being implemented within a communication system including a multi-antenna transmitter. The transmitter is disposed to transmit multiple RF input signals, each of which is comprised of a plurality of subcarier signals, through a plurality of transmit antennas so as to produce a corresponding plurality of spatially multiplexed RF output signal. The RF signal processing method includes adaptively bit loading the multiple pluralities of subcarrier signals in accordance with corresponding multiple pluralities of bit loading values in order to form corresponding multiple pluralities of bit-loaded subcarrier signals. The method further includes converting the multiple pluralities of bit-loaded subcarrier signals into the multiple RF input signals, which are then divided in order to form multiple pluralities of divided RF signals. The method also includes weighting the multiple pluralities of divided RF signals utilizing a set of transmit RF weighting values in order to form plural spatially-multiplexed weighted RF signals. In this regard the set of transmit RF weighting values and the multiple pluralities of bit loading values are selected so as to maximize an output data rate of the transmitter. Ones of the plural spatially-multiplexed weighted RF signals are then combined so as to form the plurality of spatially-multiplexed RF output signals.

The invention also relates to a signal weighting and combining method designed for implementation within a receiver having a plurality of receive antennas. During operation of the receiver, the plurality of receive antennas are disposed to produce a corresponding plurality of spatially multiplexed received RF signals in response to spatially multiplexed transmitted RF signal energy comprised of multiple pluralities of subcarrier signals. The method includes weighting the plurality of spatially multiplexed received RF signals in accordance with a corresponding plurality of receive RF weighting values, thereby forming a plurality of spatially multiplexed weighted RF signals. Consistent with the invention, the receive RF weighting values are selected, and the multiple pluralities of subcarrier signals are bit loaded, so as to maximize an output data rate. The method further includes combining ones of the plurality of spatially multiplexed weighted RF signals in order to form one or more spatially-multiplexed combined RF signals.

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION OF THE INVENTION

Figure 1A:
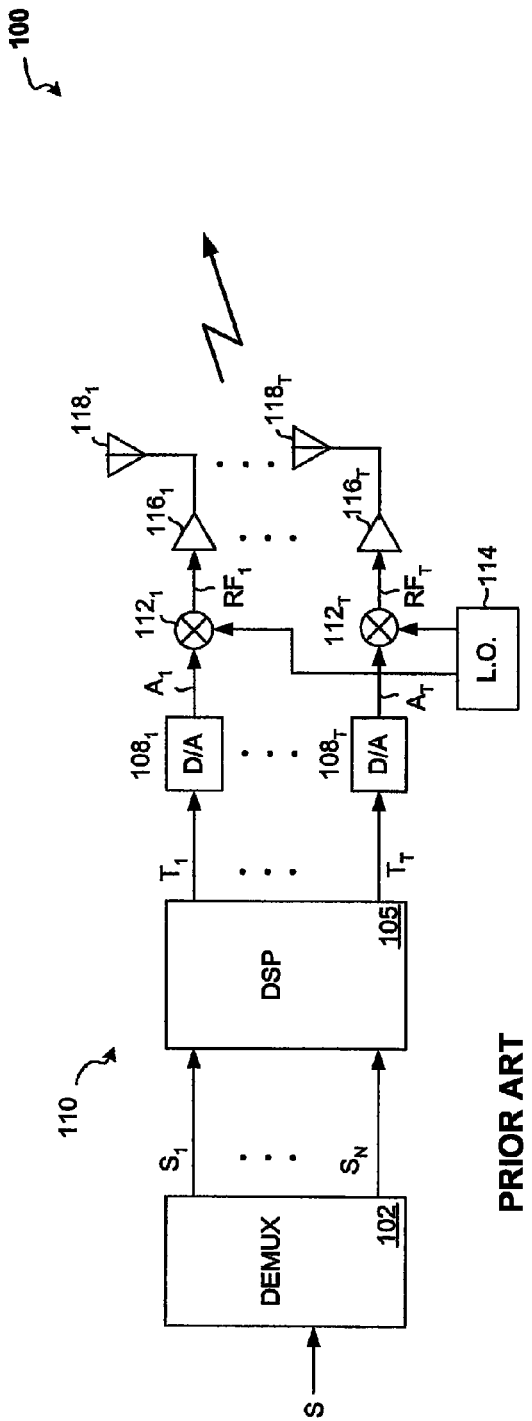
FIG. 1 illustratively represents a conventional MIMO communication system.

As is discussed below, the present invention is directed to a method of weighting and combining based upon maximum data rate for use in multi-antenna systems, including N-fold spatially-multiplexed multi-antenna systems, configured to implement adaptive bit loading upon the subcarriers of the transmitted signal energy. In order to facilitate appreciation of the principles of the invention, an overview is provided of exemplary architectures for implementing weighting and combining within such multi-antenna systems. This overview is followed by a detailed description of the inventive method of weight generation, which may be applied within the context of such weighting and combining schemes.

I. Overview of Architecture for RF Weighting and Combining

The above-referenced non-provisional copending patent applications disclose a method and apparatus for use in a wireless communication system which permits a smaller number of RF chains to be used within a transmitter and/or receiver than the number of transmit/receiver antennas utilized. In an exemplary implementation of the disclosed system within a spatially-multiplexed MIMO communication arrangement, a number (N) of RF chains are used in support of N-fold spatial multiplexing.

In the disclosed system, the signal provided by each of M (M>N) antennas of a receiver is passed through a low noise amplifier and then split, weighted and combined in the RF domain with the signals from the other antennas of the receiver. This forms N RF output signals, which are then passed through N RF chains. In this exemplary implementation each RF chain includes a filter, downconverter, and A/D converter. The output signals produced by the A/D converter of each RF chain are then digitally processed to generate the N spatially-multiplexed output signals. By performing the requisite weighting and combining at RF using relatively inexpensive components, an N-fold spatially-multiplexed system having more than N receive antennas, but only N RF chains, can be realized at a cost similar to that of a system having N receive antennas. That is, receiver performance may be improved through use of additional antennas at relatively low cost.

A similar technique can be used at a transmitter incorporating N RF chains and more than N transmit antennas. Specifically, in the exemplary embodiment the N RF chains are followed by RF splitters, weighting elements and combiners collectively operative to generate signals for each of the more than N transmit antennas. As at the receiver, by performing such weighting and combining in the RF domain using relatively inexpensive components, an N-fold spatially-multiplexed system having more than N transmit antennas, but only N RF chains, can be realized at a cost similar to that of a system having N transmit antennas. That is, transmitter performance may be improved through use of additional antennas at relatively low cost.

The reduced-complexity antenna arrangement and receiver disclosed in the above-referenced non-provisional copending patent applications is premised on performing, within the RF domain, some or all of the weighting and combining operations necessary for spatially-multiplexed communication. These operations may be performed using a plurality of RF chains within each transmitter/receiver that are fewer in number than the number of transmit/receive antennas deployed.

Spatial Multiplexing

As is known, spatial multiplexing (SM) provides a mode of signal transmission predicated upon the use of multiple antennas at both a transmitter and a receiver in such a way that the bit rate of a wireless radio link may be increased without correspondingly increasing power or bandwidth consumption. In the case in which N antennas are used at both a transmitter and a receiver, an input stream of information symbols provided to the transmitter is divided into N independent substreams. Spatial multiplexing contemplates that each of these substreams will occupy the same "channel" (e.g., time slot, frequency, or code/key sequence) of the applicable multiple-access protocol. Within the transmitter, each substream is separately applied to the N transmit antennas and propagated over an intervening multipath communication channel to a receiver. The composite multipath signals are then received by a receive array of N receive antennas deployed at the receiver. At the receiver, a "spatial signature" defined by the N phases and N amplitudes arising at the receive antenna array for a given substream is then estimated. Signal processing techniques are then applied in order to separate the received signals, which permits the original substreams to be recovered and synthesized into the original input symbol stream. The principles of spatially-multiplexed communication and exemplary system implementations are further described in, for example, "Optimum combining for indoor radio systems with multiple users", by J. H. Winters, IEEE Transactions on Communications, Vol. COM-35, No. 11, November 1987, which is hereby incorporated by reference in its entirety.

Conventional MIMO System

Figure 1B:
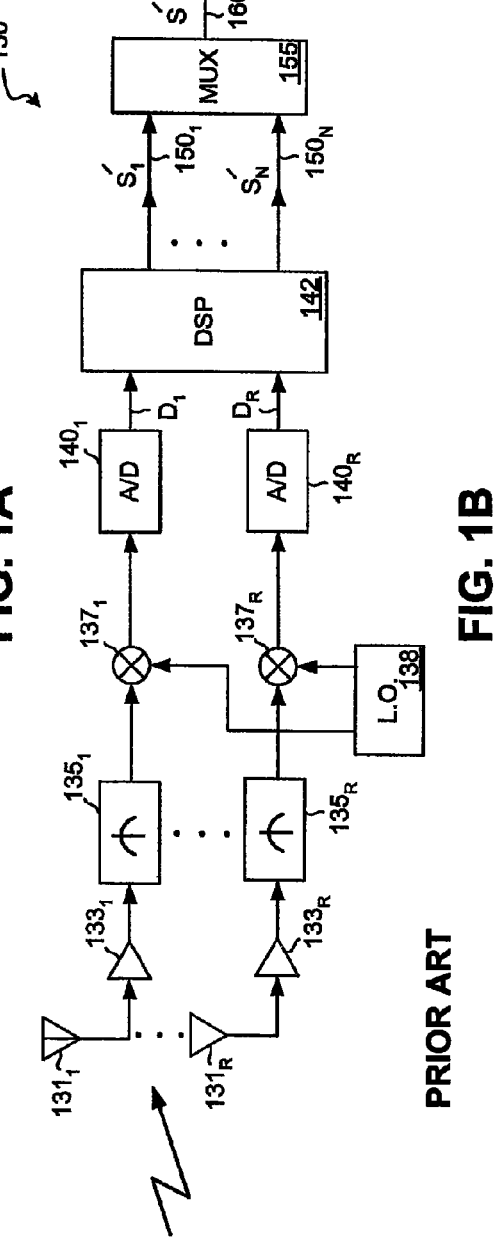

The principles of the present invention may be more fully elucidated by first considering a conventional MIMO communication system, which is illustratively represented by FIG. 1. As shown, the MIMO system 100 of FIG. 1 includes a transmitter 110 depicted in FIG. 1A and a receiver 130 depicted in FIG. 1B. The transmitter 110 and receiver 130 include a set of T transmit RF chains and a set of R receive RF chains, respectively, which are configured to transmit and receive a group of N spatially-multiplexed signals. Within the system 100 it is assumed that either (i) T is greater than N and R is equal to N, (ii) T is equal to N and R is greater than N, or (iii) both T and R are greater than N.

Referring to FIG. 1A, an input signal S to be transmitted, which typically consists of a stream of digital symbols, is demultiplexed by demultiplexer 102 into N independent substreams $S_{1, 2, \ldots, N}$. The substreams $S_{1, 2, \ldots, N}$ are then sent to digital signal processor (DSP) 105, which generates a set of T output signals $T_{1, 2, \ldots, T}$. The T output signals $T_{1, 2, \ldots, T}$ are typically generated from the N substreams $S_{1, 2, \ldots, N}$ by weighting, i.e., multiplying by a complex number, each of the N substreams $S_{1, 2, \ldots, N}$ by T different weighting coefficients to form NT substreams. These N·T substreams are then combined in order to form the T output signals $T_{1, 2, \ldots, T}$. The T output signals $T_{1, 2, \ldots, T}$ are then converted to T analog signals $A_{1, 2, \ldots, T}$ using a set of T digital-to-analog (D/A) converters 108. Each of the T analog signals $A_{1, 2, \ldots, T}$ is then upconverted to the applicable transmit carrier RF frequency within a mixer 112 by mixing with a signal provided by a local oscillator 114. The resulting set of T RF signals (i.e., $RF_{1, 2, \ldots, T}$) are then amplified by respective amplifiers 116 and transmitted by respective antennas 118.

Referring now to FIG. 1B, the RF signals transmitted by the transmitter 110 are received by a set of R receive antennas 131 deployed at the receiver 130. Each of the R signals received by an antenna 131 is amplified by a respective low noise amplifier 133 and passed through a filter 135. The resultant filtered signals are then each downconverted from RF to baseband using mixers 137, each of which is provided with a signal from local oscillator 138. Although the receiver of FIG. 1B is configured as a homodyne receiver, a heterodyne receiver characterized by an intermediate IF frequency could also be used. The respective R baseband signals produced by the mixers 137 are then converted to digital signals using a corresponding set of R analog-to-digital (A/D) converters 140. The resulting R digital signals $D_{1, 2, \ldots, R}$ are then weighted and combined using digital signal processor 142 to form N spatially-multiplexed output signals $S'_{1, 2, \ldots, N}$, which comprise estimates of the transmitted signals $S_{1, 2, \ldots, N}$. The N output signals $S'_{1, 2, \ldots, N}$ are then multiplexed using a multiplexer 155 in order to generate an estimate 160 (S') of the original input signal S.

RF Weighting and Combining in Spatially-Multiplexed Communication Systems

Turning now to FIG. 2, there is shown a block diagram of a MIMO communication system 200 having a transmitter 210 and receiver 250 configured in accordance with the principles of the above-referenced non-provisional patent applications. In the implementation of FIG. 2, the transmitter 210 and receiver 250 effect N-fold spatial multiplexing using only N transmit/receive RF chains, even though more than N transmit/receive antennas are respectively deployed at the transmitter 210 and receiver 250. Specifically, the transmitter 210 includes a set of MT transmit antennas 240 and the receiver includes a set of MR receive antennas 260, it being assumed that either (i) MT is greater than N and MR is equal to N, (ii) MT is equal to N and MR is greater than N, or (iii) both MT and MR are greater than N.

Figure 2A:
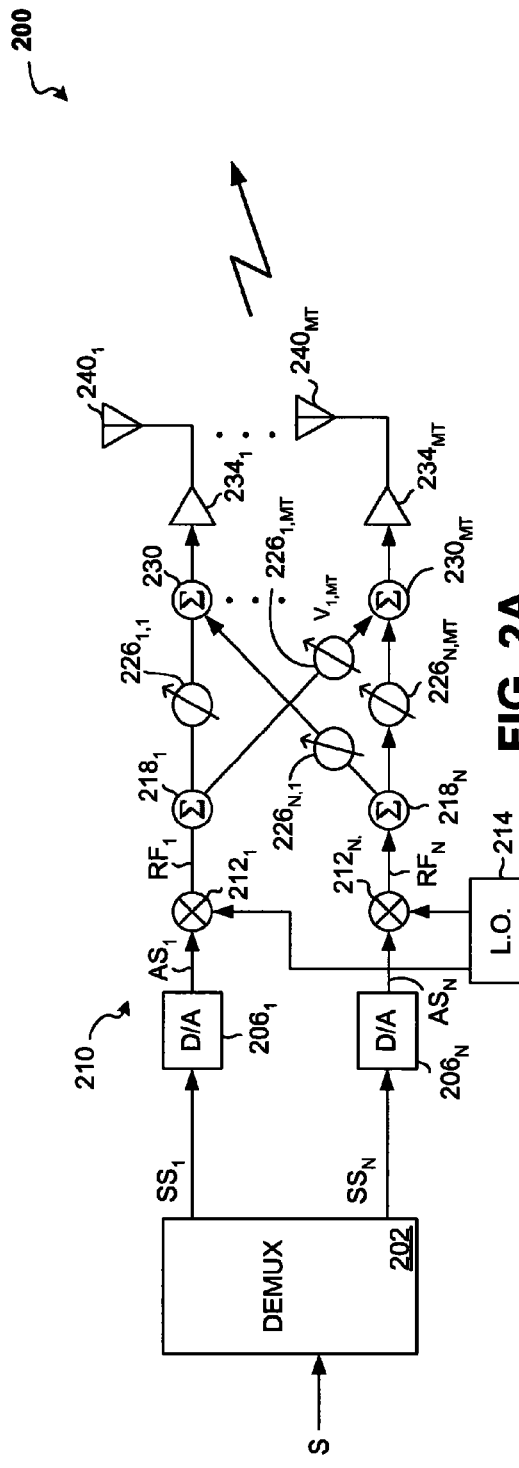
FIG. 2 shows a block diagram of a MIMO communication system having a transmitter and a receiver configured to effect RF-based weighting and combining.

As shown in FIG. 2A, an input signal S to be transmitted is demultiplexed by demultiplexer 202 into N independent substreams $SS_{1, 2, \ldots, N}$. The substreams $SS_{1, 2, \ldots, N}$ are then converted to N analog substreams $AS_{1, 2, \ldots, N}$ using a corresponding set of D/A converters 206. Next, the N analog substreams $AS_{1, 2, \ldots, N}$ are upconverted to the applicable transmit carrier RF frequency using a set of mixers 212 provided with the signal produced by a local oscillator 214. The resultant N RF signals (i.e., $RF_{1, 2, \ldots, N}$) are then each split MT ways by dividers 218 in order to form N·(MT) RF signals. These N·(MT) RF signals are each weighted using complex multipliers $226_{x,y}$, where x identifies a signal origination point at one of the N dividers 218 and y identifies a corresponding signal termination point at one of a set of MT combiners 230. The weighted RF signals are combined using the combiners 230, thereby yielding a set of MT output signals. A corresponding set of MT amplifiers 234 then amplify these MT output signals, with the amplified output signals then being transmitted using the MT antennas 240. The weighting values of the complex multipliers $226_{x,y}$ may be generated so as to maximize the SNR or to minimize the BER of the output signal at the receiver.

Figure 2B:
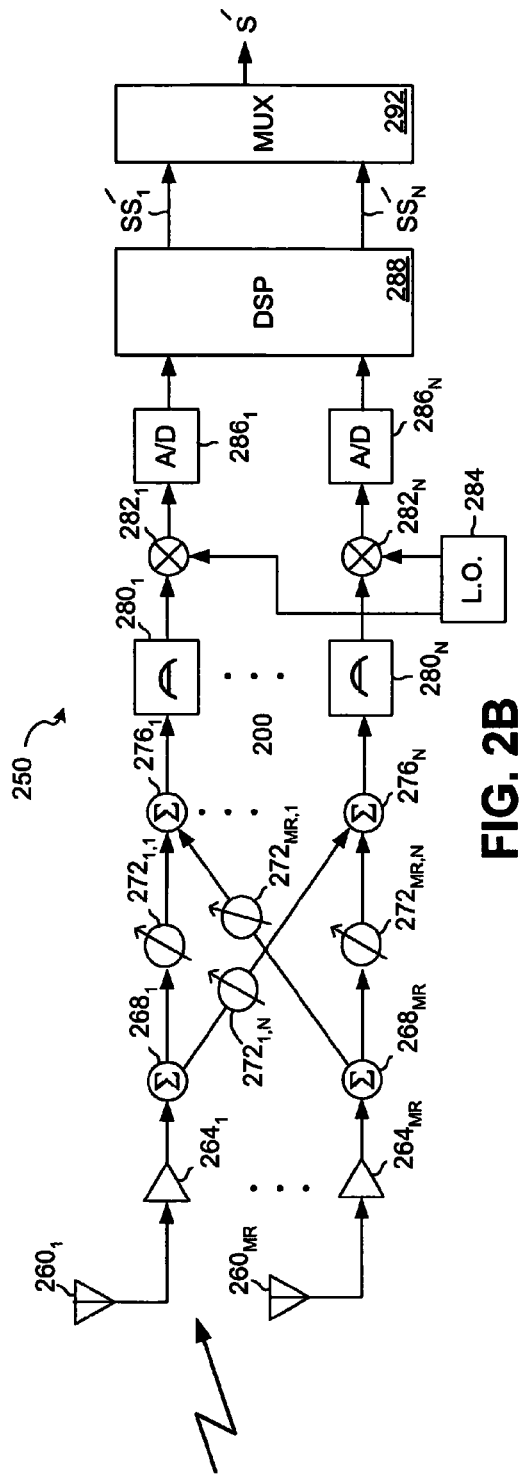

Referring to FIG. 2B, the MT RF signals transmitted by the transmitter 210 are received by the set of MR receive antennas 260 deployed at the receiver 250. Each of the MR received signals is amplified by a respective low noise amplifier 264 and then split N ways by one of a set of MR dividers 268. The resulting MR·(N) split signals are then each weighted by respective weighting circuits $272_{x,y}$, where x identifies a signal origination point at one of the MR dividers 268 and y identifies a corresponding signal termination point at one of a set of N combiners 276. These weighted signals are then combined using the N combiners 276 in order to form a set of N signals, which are passed through a corresponding set of N filters 280. The resulting N filtered signals are then downconverted to baseband using a set of N mixers 282, each of which is provided with a carrier signal produced by a local oscillator 284. Although the receiver 250 is realized as a homodyne receiver in the embodiment of FIG. 2B, it could also be implemented as a heterodyne receiver characterized by an intermediate IF frequency. The N baseband signals produced by the mixers 282 are then converted to digital signals via a corresponding set of N A/D converters 286. The N digital signals are then further processed using digital signal processor 288 to form the N spatially-multiplexed output signals $SS'_{1, 2, \ldots, N}$, which are the estimates of the N independent substreams $SS_{1, 2, \ldots, N}$. The N output signals $SS'_{1, 2, \ldots, N}$ are then multiplexed via a multiplexer 292 in order to generate the output signal S', which is an estimate of the input signal S.

It is observed that the transmitter 210 and receiver 250 are capable of implementing, within the RF domain, the same spatial weighting or linear combining schemes as are conventionally implemented at baseband via the system 100 of FIG. 1. However, the DSP 288 within the inventive receiver 250 may still perform many other baseband signal processing operations potentially effected within the system 100, such as, for example, successive interference cancellation (see, e.g., "V-BLAST: An architecture for realizing very high data rates over the rich-scattering wireless channel", *Proceedings of URSI ISSSE*, September 1998, pp. 295-300). Again, it is a feature of the disclosed system that only N transmit/receive RF chains need be employed, even when substantially more than N transmit/receive antennas are deployed.

II. Weight Generation Method for RF Weighting and Combining and Adaptive Bit Loading Based on Maximum Output Data Rate In an exemplary embodiment the present invention relates to a weight generation method for RF-based weighting and combining in a multi-antenna communication system predicated upon maximizing output data rate in the case when adaptive bit loading is also employed. In general, the embodiments described below are configured such that the signals received by multiple antennas are weighted and combined at RF using a single frequency-independent weight for each antenna. In an exemplary embodiment a single frequency-independent weight is defined such that the weight coefficients are constant over a given channel domain, including the frequency bandwidth, the tap delay profile, the time impulse response, and the Rake fingers profile. The weight generation method of the invention enables calculation of the weights that maximize the output data rate when adaptive bit loading is also performed at the transmitter. Furthermore, the method of the invention can also be used for weight generation at the transmitter when multiple antennas are used for transmission, with the transmitted signal split and weighted at RF using a single frequency-independent weight for each transmit antenna.

The teachings of the present invention are applicable to, for example, (i) receivers using multiple antennas in what are referred to herein as single channel systems (i.e., system lacking spatial multiplexing), (ii) transmitters using multiple antennas in single channel systems, and (iii) systems in which a smaller number of RF chains are used at the transmitter and/or receiver than the number of transmit/receiver antennas in a MIMO system with spatial multiplexing.

Although the present invention may be utilized in the development of RF-based weighting and combining schemes implemented using low-cost RF components, the teachings of the present invention are equally applicable to implementations containing both RF-based and baseband weighting and combining arrangements. Accordingly, both RF-based and baseband weighting and combining schemes are described hereinafter. In this regard various implementations using the weighting techniques of the invention may include only RF weighting and combining schemes while others contemplate use of both RF and baseband weighting and combining schemes. In general, it is expected that weighting and combining consistent with the invention may be more economically performed in the RF domain than at baseband, but that implementations including both RF-based and baseband combining arrangements may in certain cases offer superior performance results.

Exemplary Scenarios

The weight generation techniques of the present invention will be described hereinafter with reference to the exemplary scenarios illustratively represented by FIGS. 3-4. Specifically, the weight generation methods will be explained within the context of the following two scenarios: 1) a transmitter using multiple antennas and a receiver using multiple antennas in a single channel MIMO system without spatial multiplexing, and 2) a system whereby a smaller number of RF chains are used at the transmitter and/or receiver than the number of transmitter/receiver antennas in a MIMO system with spatial multiplexing. In each case, the signal-to-noise ratio after RF combining is discussed along with adaptive bit loading. Each of the cases may be implemented consistent with the invention using exclusively RF-based weighting and combining arrangements, as well as by using both RF-based and baseband arrangements.

Figure 3:
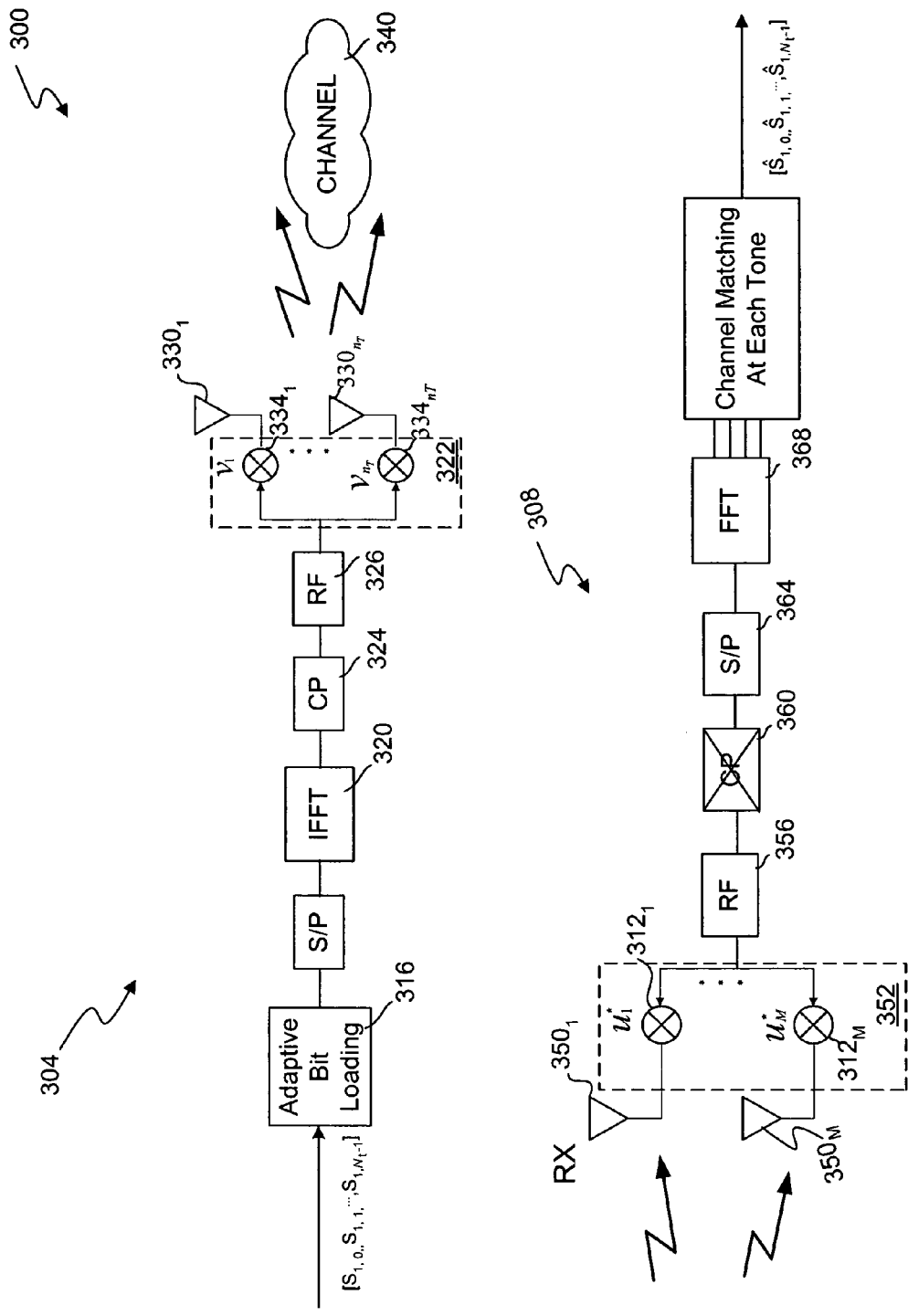
FIG. 3 illustratively represents the transmitter and receiver structure of a SC-MIMO-OFDM system utilizing an RF weighting and combining arrangement and adaptive bit loading.

FIG. 3 presents a single channel (SC) MIMO-OFDM system 300 in the case in which RF-based weighting and combining networks are employed within a transmitter 304 and a receiver 308. In the present exemplary case the combining weights 334 and 312 are implemented using RF-based elements capable of being defined by a single vector. The computation of the weights may be carried out in baseband, in which case the values of the weights are fed back to the RF domain via an internal bus.

In alternate implementations the RF-based weighting and splitting/combining arrangements 322, 352 within the transmitter 304 and receiver 308 of FIG. 3 may be complemented by similar arrangements at baseband. This results in a portion of the requisite weighting and combining being performed in the RF domain and the balance being effected at baseband.

In the embodiment of FIG. 3, the values of the RF weighting elements 334 and 312 utilized within the transmitter and receiver structures 304 and 308 are computed over space. In addition, exemplary implementations of the system structure of FIG. 3 adhere to the requirements of the 802.11a standard. That is, the transmitter 304 uses OFDM modulation, where a stream of $N_t$ consecutive quadrature amplitude modulation (QAM)-modulated data symbols, denoted by $\{s_{1,0}, s_{1,1}, \ldots, s_{1,N_t-1}\}$ is modulated onto a set of $N_t$ orthogonal subcarriers, see, e.g., J. Heiskala and J. Terry, OFDM Wireless LANs: A Theoretical and Practical Guide, Sams Publishing, December 2001. Adaptive bit loading 316 is used to generate the subcarriers, whereby the power of each of the subcarriers, as well as the modulation, is adjusted to maximize the transmitted data rate in the manner described below. As a consequence, the data symbols communicated via the various subcarriers will not necessarily each be comprised of the same number of bits. The resultant data substreams are then converted, using an Inverse Fast Fourier Transform 320, into an OFDM signal. A cyclic prefix (CP) 324 is added to this signal to mitigate inter-symbol interference (ISI). The signal is then sent through a transmit RF chain 326, and the output is split and sent to the $n_T$ transmit antenna elements 330, each of which conveys a weighted version of the OFDM signal. It is observed that in the embodiment of FIG. 3 the combining weights 334 are implemented in the RF domain rather than at baseband, which enables the number of transmit RF chains to be reduced to one (i.e., transmit RF chain 326).

Referring again to FIG. 3, the transmit signal at tone k from the $j^{th}$ antenna 330 is $$txs_{j,k} = v_j \cdot \alpha_k s_{1,k} \quad (1.)$$

The transmit vector at tone k is $$\underline{txs}_k = \underline{v} \cdot \alpha_k s_{1,k} \quad (2.)$$

where $s_{1,k}$ is the transmitted symbol at the $k^{th}$ tone (where the subscript "1" indicates that only a single data stream is being transmitted in the single channel (SC) system 300), $\alpha_k$ is the power scaling factor at tone k, and v is the transmit weight vector of size $n_T \times 1$. Although the parameter v is preferably a function of the propagation channel 340, it is not a function of the channel frequency selectivity as it is common to all tones.

In order to keep the total transmit power across the tones (i.e., $N_t \cdot P$) constant regardless of the number of transmit antenna elements 330 or of the power scaling, we assume that each of the digital symbols has a power $P/n_T$, i.e., $$E[s_{1,k} s^*_{1,k}] = P/n_T \quad (3.)$$

If the total transmit power across the tones based on (2) and (3) is given by $$TXPW = \sum_{k=1}^{N_t} E[\alpha_k^* s_{1,k}^* \underline{v}^H \underline{v} \alpha_k s_{1,k}] \quad (4.)$$

$$= |\underline{v}|^2 \sum_{k=1}^{N_t} |\alpha_k|^2 E[s_{1,k} s^*_{1,k}]$$

$$= |\underline{v}|^2 P/n_T \sum_{k=1}^{N_t} |\alpha_k|^2 = N_t P$$

then the constraint on the frequency-scaled transmit weights is expressed as $$|\underline{v}|^2 \sum_{k=1}^{N_t} |\alpha_k|^2 = N_t n_T \quad (5.)$$

Once the signal has propagated through the channel 340, received signal energy is collected from each of the M receive antenna elements 350 of the receiver 308. This received signal energy may be expressed as an M-dimensional vector, where the received signal energy vector at tone k becomes:

$$\underline{r}_k = H_k \cdot \underline{v} \cdot \alpha_k s_{1,k} + \underline{n}_k \quad (6.)$$

where $\underline{r}_k = [r_{1,k}, r_{2,k}, \ldots r_{M,k}]^T$ and $\underline{n}_k = [n_{1,k}, n_{2,k}, \ldots n_{M,k}]^T$ are M-dimensional vectors, with $\underline{n}$ being complex-valued additive white Gaussian noise (AWGN) with zero-mean and variance $\sigma^2$.

$$H_k = \begin{bmatrix} H_{1,1}\left(e^{j\frac{2\pi}{N_t}k}\right), \ldots, H_{1,n_T}\left(e^{j\frac{2\pi}{N_t}k}\right) \\ \vdots \\ H_{M,1}\left(e^{j\frac{2\pi}{N_t}k}\right), \ldots, H_{M,n_T}\left(e^{j\frac{2\pi}{N_t}k}\right) \end{bmatrix}$$

is an $M \times n_T$ matrix which is the channel frequency response of the L-tap channel impulse response denoted by $\{h_o, h_1, \ldots, h_{L-1}\}$. The relationship between frequency-domain H and time-domain h is:

$$H\left(e^{j\frac{2\pi}{N_t}k}\right) = \sum_{l=0}^{L-1} h_l e^{-j\frac{2\pi}{N_t}lk} \quad (7.)$$

The signal energy received at each of the M antenna elements 350 is weighted at RF by a weighting element 312, which may be characterized by a one-dimensional vector u that is common to all tones. The weighted signal energy produced by the M weighting elements 312 is then summed and down-converted 356 from RF to baseband. Next, the cyclic prefix (CP) is removed 360. The resultant symbols are then mapped, subsequent to a serial-to-parallel conversion 364, to the subcarriers of a fast Fourier transform (FFT) 368. The combined received signal at the output of the FFT 368 can thus be written as:

$$y_k = \hat{s}_{1,k} = \underline{u}^H \cdot \underline{r}_k = \underline{u}^H H_k \cdot \underline{v} \cdot \alpha_k s_{1,k} + \underline{u}^H \underline{n}_k \quad (8.)$$

where $y_k$ is the estimate of $s_{1,k}$.

The corresponding output SNR at tone k is:

$$SNR_k = \frac{\|\underline{u}^H H_k \cdot \underline{v}\|^2 |\alpha_k|^2 E[s_{1,k} s^*_{1,k}]}{\sigma^2 \|\underline{u}\|^2} = \frac{\|\underline{u}^H H_k \cdot \underline{v}\|^2 |\alpha_k|^2 P/n_T}{\sigma^2 \|\underline{u}\|^2} \quad (9.)$$

In the above-identified copending provisional and non-provisional patent applications, approaches are described for selecting the transmit and receive weights u and v so as to maximize the SNR averaged over the tones or to minimize the BER. However, these approaches are generally applicable to cases in which the same modulation is applied to each subcarrier of the transmitted signal. As is described further below, the present invention provides a method for maximizing the overall data rate for a given set of transmit and receive weights when adaptive bit loading is applied to the signal subcarriers. Although many variations of this method may be employed, adaptive bit loading typically involves selecting (i) the power for each subcarrier in accordance with "waterfilling" techniques (i.e., in which more power is allocated to those subcarriers characterized by relatively higher SNR at the receiver, with the total power distributed among all subcarriers remaining constant) and (ii) the data rate (modulation) in each subcarrier to be the maximum possible in view of the desired output SNR and/or BER. The use of adaptive bit loading advantageously increases the data rate for a given set of transmit and receive weights relative to systems in which uniform power and modulation is applied to each subcarrier.

However, it has been found that neither the transmit/receive weights that maximize the average output SNR nor those that minimize the BER necessarily maximize the data rate when bit loading is also employed. Instead, in one aspect the present invention contemplates that both the transmit/receive weights and adaptive bit loading parameters be jointly determined so as to maximize this data rate. This joint determination is preferably effected by searching over all possible sets of weights (with quantization), calculating the data rate for each set of weights when adaptive bit loading is also employed, and identifying the set of weights which in combination with adaptive bit loading yields the highest data rate. Other search methods (e.g., simulated annealing) may be utilized in alternate implementations.

In connection with this search for an optimum set of weighting values in the presence of adaptive bit loading, each tone k may be characterized by the following parameters:
$SNR_k$: output SNR
$\alpha_k$: power scaling factor
$R_k$: coded bit rate (associated to a pair of modulation and coding rate)
$BER_k$: bit error rate In exemplary embodiments of the invention this search entails jointly determining the (i) transmit and receive weights u and v, and (ii) distribution of subcarrier power scaling factors $\overline{\alpha_k}$ and bit rate $R_k$ such that the overall data rate $R_T$ is maximized, where $R_T$ is defined as $$R_T = \sum_{k=1}^{N_t} R_k \quad (10.)$$

This joint determination is performed under the constraint that the bit error rate at each tone is equal to or smaller than a pre-selected bound, i.e., $$BER_k \leq \text{bound}, k=1, \ldots, N_t$$

A BER associated with each bit rate $R_k$ may be determined for a given $SNR_k$; that is, the BER at each tone k ($BER_k$) may be expressed as a function of the bit rate and SNR as follows:

$$BER_k = f_{R_k}(SNR_k) \quad (11.)$$

The search for the set of transmit/receive weights which maximizes the data rate $R_T$ (Equation (10)) under the above constraints may be mathematically summarized as follows:

$$\underset{\underline{u},\underline{v},\{\alpha_k\},\{R_k\}}{\operatorname{argmax}} \ (R_T) \text{ subject to} \quad (12.)$$

1) $|\underline{v}|^2 \sum_{k=1}^{N_t} |\alpha_k|^2 = N_t n_T$

2) $BER_k \leq \text{bound}, k=1, \ldots, N_t$ where the coded bit rate $R_k$ may be selected from the various rates presented in Table 1. It is to be understood that the coded bit rates $R_k$ set forth in Table 1 are merely exemplary, and coded bit rates $R_k$ corresponding to essentially any pair of modulation/coding rate values may be utilized. In operation, when $R_k=0$ is selected the $k^{th}$ subcarrier is not used for transmission; that is, no transmit power is allocated to the $k^{th}$ tone, typically because of adverse propagation characteristics of the channel 340 at such tone.

TABLE 1

| $R_k$ (bps/Hz) | Modulation | Coding Rate |
| --- | --- | --- |
| 0 | NA | NA |
| 0.5 | BPSK | 1/2 |
| 0.75 | BPSK | 3/4 |
| 1 | QPSK | 1/2 |
| 2 | 16QAM | 1/2 |
| 4 | 64QAM | 2/3 |
| 4.5 | 64QAM | 3/4 |

In summary, for each given set of weights, u and v, and set of power scaling factors $\alpha_k$, the output SNR at tone k can be computed according to Equation (9). Given $SNR_k$, the value for $R_k$ is found by jointly selecting the modulation and coding rate pair that yields the maximum bit rate while maintaining the applicable $BER_k$ within a predefined range.

In practical implementations, the search for the optimal combination of bit loading parameters and weighting values is performed consistent with Equation (12) relative to both the amplitudes and phases of the weights u and v. The phases of course belong to a finite range between 0 and 360 degrees, and are typically varied in increments of between 1 and 10 degrees during the search process. The amplitudes of the weighting values optimizing Equation (12) will generally fall within a range of between 0 and 20 dB, and are typically varied between 0.1 and 1 dB during consecutive iterations of the search process.

The adaptive bit loading parameters and the weights u and v are preferably modified as frequently as the applicable channel changes state. For example, in the case of a slowly-varying channel it would be necessary to change the weights u and v only relatively infrequently. In certain embodiments channel variations are characterized by a parameter generally characterized as channel coherence time. The channel coherence time is defined as the period of time during which the state characteristics of the applicable channel remain fairly stable; that is, a high correlation exists between the channel state at the beginning and end of the period. In these embodiments the weighting and bit loading values are changed at a frequency related to the channel coherence time.

In certain embodiments channel coherence time may be derived from channel state information (CSI) acquired at the applicable receiver and fed back to the transmitter via a control message. In these embodiments, a training sequence composed of known symbols is sent from the transmitter to the receiver. At the receiver, the channel is estimated based on the received signal and the known sequence of symbols.

There exist many channel estimation techniques based on training sequences; see, e.g., J.-J. van de Beek et al., "On Channel Estimation in OFDM Systems," *IEEE 45th Vehicular Technology Conference*, vol. 2, 25-28 Jul. 1995, pp. 815-819, which is incorporated herein by reference. In cases in which the applicable uplink and downlink channels are substantially identical, the transmitter may receive a training sequence via the uplink channel and derive CSI. This enables determination of the transmit/receive weighting values and adaptive bit loading parameters at the transmitter without the need for feedback of channel state information.

Figure 4:
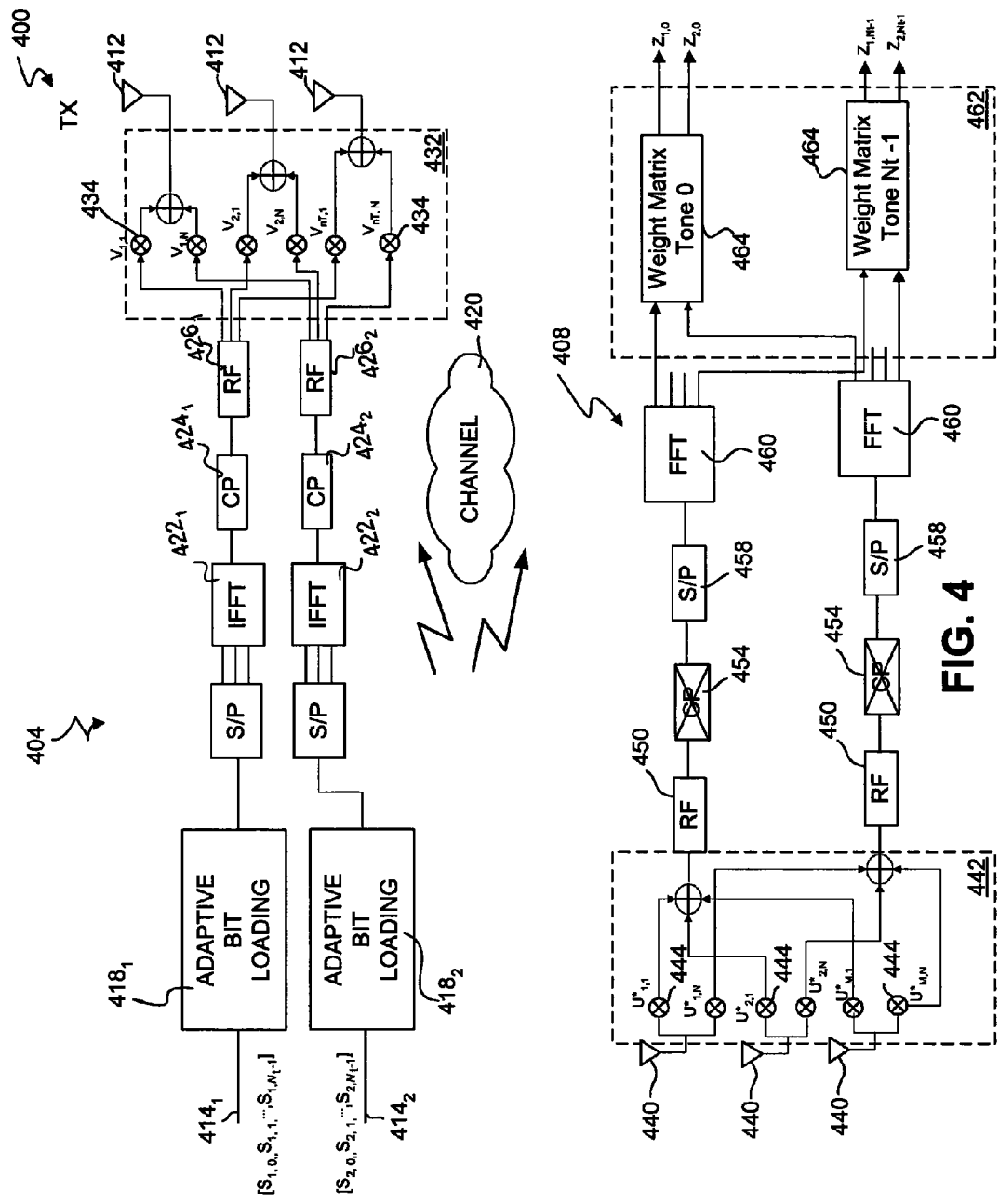
FIG. 4 illustratively represents the transmitter and receiver structure of a spatially-multiplexed (SM)-MIMO-OFDM system utilizing an RF weighting and combining arrangement and adaptive bit loading.

FIG. 4 illustratively represents a MIMO-OFDM system 400 which includes a transmitter 404 and a receiver structure 408 configured to support spatially-multiplexed communication utilizing RF-based and baseband combining. The transmitter 404 is composed of $n_T$ transmitting antenna elements 412, each of which conveys a weighted combination of N distinct sub-streams (i.e. spatially-multiplexed signals). In the implementation of FIG. 4 each of the N (i.e., 2) sub-streams is modulated using OFDM modulation techniques. That is, in the system 400 multiple streams 414 of $N_t$ consecutive data symbols, denoted by $\{s_{i,0}, s_{i,1}, \ldots s_{i,N-1}\}$, i=1, ..., N, are modulated onto each of a set of $N_t$ orthogonal subcarriers. Adaptive bit loading 418 is used to generate the subcarriers, whereby the power of each of the subcarriers, as well as the modulation, is adjusted to maximize the transmitted data rate. As a consequence, the data symbols communicated through channel 420 via the various subcarriers will not necessarily each be comprised of the same number of bits. The data substreams produced via adaptive bit loading 418 are then converted, using an Inverse Fast Fourier Transform 422, into a OFDM signal for each of the N spatially-multiplexed signals. A cyclic prefix (CP) 424 is added to each signal to mitigate inter-symbol interference (ISI). Each signal is then sent through a transmit RF chain 426, and the outputs are split and sent to the $n_T$ transmitting antenna elements 412 after being weighted by a combining weight 434 within RF-based weighting and combining network 432. In this configuration, the transmit signal at tone k out of the $j^{th}$ antenna element 412 is:

$$txs_{j,k} = \sum_{i=1}^{N} v_{j,i} \cdot \alpha_{i,k} s_{i,k} \quad (13.)$$

The transmit vector at tone k is $$txs_k = V \cdot \underline{\alpha}_k s_k = \sum_{i=1}^{N} \underline{v}_i \cdot \alpha_{i,k} s_{i,k} \quad (14.)$$

where V is a matrix of values of the combining weights 434 of size $n_T \times N$. It is observed that the matrix V does not depend on the index k, since in the exemplary embodiment the value of each combining weight is constant over all frequency tones. In order to maintain a constant total transmit power across the tones (i.e., $N_t \cdot P$) irrespective of the number of transmit antenna elements 412 or of the power scaling effected through adaptive bit loading 418, we assume that each of the digital symbols has a power $P/n_T$, i.e., $$E[s_{i,k} s^*_{i,k}] = P/n_T, i=1, \ldots, N \quad (15.)$$

Based on (14) and (15), the total transmit power across all frequency tones is given by:

$$TXPW = \sum_{k=1}^{N_t} \sum_{i=1}^{N} E[\alpha^*_{i,k} s^*_{i,k} \underline{v}^H_i \underline{v}_i \alpha_{i,k} s_{i,k}] \quad (16.)$$

$$= \sum_{i=1}^{N} |\underline{v}_i|^2 \sum_{k=1}^{N_t} |\alpha_{i,k}|^2 E[s_{i,k} s^*_{i,k}]$$

$$= P/n_T \sum_{i=1}^{N} |\underline{v}_i|^2 \sum_{k=1}^{N_t} |\alpha_{i,k}|^2 = N_t P$$

Using (16), the constraint on the frequency-scaled transmit weights is expressed as $$\sum_{i=1}^{N} |\underline{v}_i|^2 \sum_{k=1}^{N_t} |\alpha_{i,k}|^2 = N_t n_T \quad (17.)$$

The signal received by the antenna elements 440 of receiver 408 at tone k may be expressed in vector form as:

$$\underline{r}_k = H_k \cdot V \cdot \underline{\alpha}_k s_k + \underline{n}_k \quad (18.)$$

Referring again to FIG. 4, this received signal vector is multiplied in the RF domain by an M×N matrix U of combining weights 444 arranged within RF-based weighting and combining network 442. The resulting output signal at tone k is given by $$\underline{y}_k = U^H \cdot \underline{r}_k = U^H H_k \cdot V \cdot \underline{\alpha}_k s_k + U^H \underline{n}_k \quad (19.)$$

Expression (19) can also be written as:

$$\underline{y}_k = H_k'' \cdot \underline{\alpha}_k s_k + \underline{\eta}_k \quad (20.)$$

where $H_k'' = U^H H_k \cdot V$ and $\underline{\eta}_k = U^H \underline{n}_k$.

The N×1 vector $\underline{y}_k$ is converted 450 into baseband and the cyclic prefix is removed 454. After serial to parallel conversion 458 and FFT processing 460, the received baseband signals are processed within a baseband weighting and combining network 462 using an additional set of weights 464 so as to separate and recover the several spatially-multiplexed signals. The final output signal produced by the receiver 408 may be expressed as:

$$\underline{z}_k = W_k^H \underline{y}_k = W_k^H H_k'' \cdot \underline{\alpha}_k s_k + W_k^H \underline{\eta}_k \quad (21.)$$

The output signal corresponding to the $i^{th}$ spatially-multiplexed signal, at tone k is:

$$z_{i,k} = \underline{w}_{k,i}^H \underline{y}_k = \underline{w}_{k,i}^H U^H H_k \cdot V \cdot \underline{\alpha}_k s_k + \underline{w}_{k,i}^H U^H \underline{n}_k \quad (22.)$$

$$z_{i,k} = \underline{w}_{k,i}^H U^H H_k \cdot \underline{v}_i \cdot \alpha_{i,k} s_{i,k} + \underline{w}_{k,i}^H U^H \left( \sum_{j \neq i} H_k \cdot \underline{v}_j \cdot \alpha_{j,k} s_{j,k} + \underline{n}_k \right) \quad (23.)$$

where $z_{i,k}$ is the estimate of $s_{i,k}$.
The corresponding output SINR is:

$$SINR_{i,k} = \frac{\sigma_s^2 |\alpha_{i,k}|^2 \underline{w}_{k,i}^H U^H H_k \cdot \underline{v}_i \underline{v}_i^H H_k^H U \underline{w}_{k,i}}{\sigma_s^2 \sum_{j \neq i} |\alpha_{j,k}|^2 \underline{w}_{k,i}^H U^H H_k \cdot \underline{v}_j \underline{v}_j^H H_k^H U \underline{w}_{k,i} + \sigma^2 \underline{w}_{k,i}^H U^H U \underline{w}_{k,i}} \quad (24.)$$

In the above-identified copending provisional and non-provisional patent applications, approaches are described for selecting the transmit and receive weights u and v so as to maximize the SNR averaged over the tones or to minimize the BER. However, these approaches are generally applicable to cases in which the same modulation is applied to each subcarrier of the transmitted signal. As was mentioned above with regard to the previous scenario of FIG. 3, the present invention provides a method for maximizing the overall data rate for a given set of transmit and receive weights using adaptive bit loading. Specifically, for a given set of transmit and receive weights for each of the spatially-multiplexed signals, the subcarrier powers and modulation for each signal can be chosen to maximize the overall data rate using adaptive bit loading.

As may be appreciated from Equation (24), in the present exemplary scenario the power in a given tone of one spatially-multiplexed signal affects the output SINR for that tone in the other spatially-multiplexed signals. It follows that achievement of an optimal SINR generally requires adaptive bit loading to be performed jointly for all signals at each tone. This may be characterized as "multiuser" adaptive bit loading, for which techniques have been derived in other contexts, see, e.g., "A simple multiuser bit loading algorithm for multicarrier WLAN", A. G. Armada, IEEE International Conference on Communications, Volume: 4, 2001, pages 1168-1171, and "Multiuser DMT: a multiple access modulation scheme", S. N. Diggavi, Global Telecommunications Conference, 18-22 November 1996, pages 1566-1570, vol.3. In one aspect, the present invention contemplates that multiuser adaptive bit loading may be employed in conjunction with RF-based and possibly baseband weighting and combining techniques in order to increase data rate relative to the case in which adaptive bit loading is not utilized. However, it has been found that such data rate is optimized only when the weighting values and bit loading parameters are jointly determined; that is, neither the weights that maximize the average output SNR nor those that minimize the BER necessarily maximize the data rate when bit loading is also employed. One method of performing this joint determination is to search over all possible sets of weights, calculating the data rate with multiuser adaptive bit loading for each set of weights. The set of weights which, in combination with multiuser adaptive bit loading, yield the highest data rate is selected for use within the system 400. In alternate embodiments other search methods, such as simulated annealing, may be invoked.

In the context of the present scenario, tone k of an $i^{th}$ spatially-multiplexed signal is characterized by the following parameters:

$SINR_{i,k}$: the output SINR
$\alpha_{i,k}$: the power scaling factor
$R_{i,k}$: the coded bit rate (associated to a pair of modulation and coding rate)
$BER_{i,k}$: the bit error rate In this context, the search involves jointly determining (i) the transmit and receive weight matrices U, V and $W_k$, and (ii) the distribution of subcarrier power scaling factors ($\alpha_{i,k}$) and bit rate ($R_{i,k}$) such that the overall data rate $R_T$ is maximized, where $R_T$ is defined as $$R_T = \sum_{i=1}^{N} \sum_{k=1}^{N_t} R_{i,k} \qquad (25.)$$

In the exemplary embodiment maximization of $R_T$ is performed under the constraint that the bit error rate at each tone for each spatially-multiplexed signal ($BER_{i,k}$) is equal to or smaller than a pre-selected bound, i.e., that $BER_{i,k} \leq \text{bound}, k=1,\ldots,N_t; i=1,\ldots,N$ Each bit rate $R_{i,k}$ has an associated BER, given $SINR_{i,k}$, i.e., the BER at tone k is a function of the bit rate and SINR as $$BER_{i,k} = f_{R_{i,k}}(SINR_{i,k}) \qquad (26.)$$

The global search for the set of transmit/receive weights which maximizes the data rate $R_T$ under the above constraints may be mathematically summarized as follows:

$$\underset{U,V,W_k,\{\alpha_{i,k}\},\{R_{i,k}\}}{\arg\max} \;(R_T) \text{ subject to} \qquad (27.)$$

1) $\sum_{i=1}^{N} |v_i|^2 \sum_{k=1}^{N_t} |\alpha_{i,k}|^2 = N_t n_T$

2) $BER_{i,k} \leq \text{bound}, k = 1, \cdots, N_t; i = 1, \cdots, N$

In an alternative embodiment, the baseband weights at the receiver, $W_k$, can be withdrawn from the global search of Equation (27) and determined through the following closed-form solution for a given U, V, and $\{\alpha_{i,k}\}$:

$$W_k = (H_k^H R_{s,k} H_k^H + R_{\eta,k})^{-1} H_k^H R_{s,k} \qquad (28.)$$

where $R_{s,k} = \sigma_s^2 \text{diag}(\alpha_k)$ and $R_{\eta,k} = E[\eta_k \eta_k^H] = \sigma^2 U^H U$.

The closed-form expression of Equation (28) corresponds to the known minimum mean squared error (MMSE) solution (i.e., the Wiener-Hopf solution), see, e.g., S. Haykin, Adaptive Filter Theory, $3^{rd}$ Ed., Prentice Hall, 1996, and effectively minimizes the mean squared error between the transmitted and estimated symbols. Consistent with this approach, the combination of RF weighting and bit loading parameters which maximize the data rate are initially determined, and then $W_k$ is automatically derived from these parameters to minimize the mean squared error in accordance with Equation (28).

In summary, for each given set of weights U, V and $W_k$ and set of power scaling factors $\alpha_k$, the output SINR at tone k for all spatially-multiplexed signals can be computed according to Equation (24). Given the set of $SINR_{i,k}$ for all spatially-multiplexed signals, the value for the set $R_{i,k}$ is found by jointly selecting the modulation and coding rate pair that yields the maximum overall bit rate while maintaining the applicable $BER_k$ for all spatially-multiplexed signals within an acceptable range. The weighting values and adaptive bit loading parameters selected in accordance with Equation (27) or (28) will generally be modified based upon changes in channel conditions in the manner described above with reference to the previous scenario.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following claims and their equivalents define the scope of the invention.

What is claimed is:

1. In a multi-antenna transmitter disposed to transmit an RF input signal through a plurality of transmit antennas so as to produce a corresponding plurality of RF output signals, said RF input signal being comprised of a plurality of subcarrier signals, an RF signal processing method comprising:

adaptively bit loading said plurality of subcarrier signals in accordance with a corresponding plurality of bit loading values in order to form a corresponding plurality of bit-loaded subcarrier signals, wherein said plurality of bit loaded subcarrier signals are transported by a first transmit path and a second transmit path in the multi-antenna transmitter, wherein said adaptively bit loading comprises individually selecting a respective power scaling factor for each of said plurality of subcarrier signals so that said subcarrier signals characterized by higher signal-to-noise ratios at a remote receiver are allocated more power than said subcarrier signals characterized by lower signal-to-noise ratios at said remote receiver, and wherein said adaptively bit loading comprises individually selecting a respective modulation for each of said plurality of subcarrier signals in which a same modulation is not applied to each of said plurality of subcarrier signals;

converting said plurality of bit-loaded subcarrier signals into said RF input signal in each of said first transmit path and said second transmit path;

dividing said RF input signal, in each of said first transmit path and said second transmit path, in order to form a plurality of at least three divided RF signals;

weighting a first of the divided RF signals from said first transmit path with a first transmit RF weighting value, weighting a first of the divided RF signals from said second transmit path with a second transmit RF weighting weight, and combining said weighted first RF signal from said first transmit path and said weighted first RF signal from said second transmit path before transmitting over a first antenna;

weighting a second of the divided RF signals from said first transmit path with a third transmit RF weighting value, weighting a first of the divided RF signals from said second transmit path with a fourth transmit RF weighting weight, and combining said weighted second RF signal from said first transmit path and said weighted second RF signal from said second transmit path before transmitting over a second antenna; and weighting a third of the divided RF signals from said first transmit path with a fifth transmit RF weighting value, weighting a first of the divided RF signals from said second transmit path with a sixth transmit RF weighting weight, and combining said weighted third RF signal from said first transmit path and said weighted third RF signal from said second transmit path before transmitting over a third antenna, wherein parameters used for bit loading and transmit RF weighting values are modified as frequently as a particular communication channel changes state.

2. The method of claim 1 wherein said RF input signal comprises an orthogonal frequency division multiplexed signal.

3. The method of claim 1 wherein said plurality of transmit RF weighting values are selected from a plurality of sets of weighting values defining a weight space, the method further including performing a calculation of said output data rate of said transmitter with respect to each of said plurality of sets of weighting values.

4. The method of claim 3 wherein said plurality of subcarrier signals are adaptively bit loaded in connection with each said calculation.

5. The method of claim 1 wherein said plurality of RF output signals are transmitted through a channel and received by a receiver having a set of receive antennas disposed to produce a corresponding set of received RF signals, each of said received RF signals being weighted and combined with at least one other of said received RF signals utilizing a set of receive RF weighting values.

6. The method of claim 5 wherein said plurality of transmit RF weighting values and said set of receive RF weighting values are selected from a plurality of sets of weighting values defining a weight space, the method further including performing a calculation of said output data rate of said transmitter with respect to each of said plurality of sets of weighting values.

7. The method of claim 1 wherein at least said RF transmit weighting values of said transmitter, said RF receive weighting values of said remote receiver and said power scaling factors are jointly determined for said plurality of subcarriers such that an overall data rate over all of said plurality of subcarriers is maximized.

8. The method of claim 1 wherein said plurality of RF weighting values and said plurality of bit loading values are found via a simulated annealing search.

9. In a receiver having a plurality of receive antennas disposed to produce a corresponding plurality of received RF signals, each of said plurality of received RF signals being generated in response to a transmitted RF signal comprised of a plurality of subcarrier signals, a signal weighting and combining method comprising:

receiving said plurality of received RF signals by at least three antennas;

dividing said plurality of received RF signals received by each antenna into a first receive path and a second receive path of said receiver;

weighting a first of said divided RF signals of a first antenna with a first RF receive weight, weighting a first of said divided RF signals of a second antenna with a second RF receive weight, weighting a first of said divided RF signals of a third antenna with a third RF receive weight, and combining said first weighted RF signal of said first antenna, said first weighted RF signal of said second antenna and said first weighted RF signal of said third antenna before sending along said first receive path of said receiver;

weighting a second of said divided RF signals of said first antenna with a fourth RF receive weight, weighting a second of said divided RF signals of said second antenna with a fifth RF receive weight, weighting a second of said divided RF signals of said third antenna with a sixth RF receive weight, and combining said second weighted RF signal of the first antenna, said second weighted RF signal of said second antenna and said second weighted RF signal of said third antenna before sending along said second receive path of said receiver, wherein said RF weighting values of said receiver, RF transmit weighting values of a remote transmitter in communication with said receiver, transmit power scaling factors of said remote transmitter, and coded bit rates of said remote transmitter are jointly determined for each of said plurality of subcarrier signals to maximize an overall data rate of all of said plurality of subcarrier signals, wherein the RF weighting values of said receiver and the RF transmit weighting values of the remote transmitter are modified as frequently as a particular communication channel changes state;

downconverting, in each of said first receive path and said second receive path, said one or more combined RF signals into baseband signals;

processing, in parallel, said one or more baseband signals into one or more particular signals, each of said particular signals corresponding to a respective tone of said plurality of subcarrier signals; and baseband weighting, in parallel, each of said one or more particular signals.

10. The method of claim 9 wherein said transmitted RF signal comprises an orthogonal frequency division multiplexed signal.

11. The method of claim 9 wherein said plurality of RF weighting values are selected from a plurality of sets of weighting values defining a weight space, the method further including performing a calculation of said output data rate with respect to each of said plurality of sets of weighting values.

12. The method of claim 11 wherein said plurality of subcarrier signals are adaptively bit-loaded in connection with each said calculation.

13. The method of claim 9 or 12 wherein said bit-loaded corresponds to one or more of adjusted power, modulation and coding rate.

14. In a communication system including a multi-antenna transmitter disposed to transmit multiple RF input signals through a plurality of transmit antennas so as to produce a corresponding plurality of spatially multiplexed RF output signals, said multiple RF input signals being comprised of corresponding multiple pluralities of subcarrier signals, an RF signal processing method comprising:

adaptively bit loading said multiple pluralities of subcarrier signals in accordance with corresponding multiple pluralities of bit loading values in order to form corresponding multiple pluralities of bit-loaded subcarrier signals, wherein said plurality of bit loaded subcarrier signals are transported by a first transmit path and a second transmit path in the multi-antenna transmitter, wherein said adaptively bit loading comprises individually selecting a respective power scaling factor for each of said plurality of subcarrier signals so that said subcarrier signals characterized by higher signal-to-noise ratios at a remote receiver are allocated more power than said subcarrier signals characterized by lower signal-to-noise ratios at said remote receiver and wherein said adaptively bit loading comprises individually selecting a respective coded bit rate for each of a plurality of subcarrier signals in which a same coded bit rate is not applied to each of said plurality of subcarrier signals;

converting said multiple pluralities of bit-loaded subcarrier signals into said multiple RF input signals in each of said first transmit path and said second transmit path;

dividing said multiple RF input signals, in each of said first transmit path and said second transmit path, in order to form multiple pluralities of at least three divided RF signals;

weighting a first of the divided RF signals from said first transmit path with a first transmit RF weighting value, weighting a first of the divided RF signals from said second transmit path with a second transmit RF weighting weight, and combining said weighted first RF signal from said first transmit path and said weighted first RF signal from said second transmit path before transmitting over a first antenna;

weighting a second of the divided RF signals from said first transmit path with a third transmit RF weighting value, weighting a first of the divided RF signals from said second transmit path with a fourth transmit RF weighting weight, and combining said weighted second RF signal from said first transmit path and said weighted second RF signal from said second transmit path before transmitting over a second antenna; and weighting a third of the divided RF signals from said first transmit path with a fifth transmit RF weighting value, weighting a first of the divided RF signals from said second transmit path with a sixth transmit RF weighting weight, and combining said weighted third RF signal from said first transmit path and said weighted third RF signal from said second transmit path before transmitting over a third antenna, wherein parameters used for bit loading and transmit RF weighting values are modified as frequently as a particular channel changes state.

15. The method of claim 14 wherein the multiple RF input signals comprise orthogonal frequency division multiplexed signals.

16. The method of claim 14 wherein at least said RF transmit weighting values of said transmitter, said RF receive weighting values of said remote receiver and said power scaling factors are jointly determined for said plurality of subcarriers such that an overall data rate over all of said plurality of subcarriers is maximized.

17. The method of claim 14 wherein said plurality of spatially multiplexed RF output signals are transmitted through a channel and received by a receiver having a set of receive antennas disposed to produce a corresponding set of spatially multiplexed received RF signals, each of said received RF signals further being weighted by a plurality of receive RF weighting values and provided to an RF combining network within said receiver.

18. The method of claim 17 wherein said set of transmit RF weighting values and said plurality of receive RF weighting values are selected from a plurality of sets of weighting values defining a weight space, the method further including calculating said output data rate of said transmitter with respect to each of said plurality of sets of weighting values using multi-user adaptive bit loading.

19. The method of claim 17 wherein said set of transmit RF weighting values, said plurality of receive RF weighting values and said multiple pluralities of bit loading values are found via a simulated annealing search.

20. The method of claim 17 further including:
downconverting a set of RF signals produced by said RF combining network in order to produce a set of baseband signals;
generating pluralities of baseband subcarrier signals using said set of baseband signals; and
weighting and combining ones of said baseband subcarrier signals utilizing a first set of baseband weighting values.

21. The method of claim 20 wherein said set of transmit RF weighting values, said plurality of receive RF weighting values and said first set of baseband weighting values are computed jointly.

22. The method of claim 14 further including performing a splitting and weighting operation upon plural baseband input signals utilizing a second set of baseband weighting values in order to form a second set of baseband signals wherein said multiple pluralities of subcarrier signals are generated based upon one or more of said second set of baseband signals.

23. The method of claim 22 wherein said set of transmit RF weighting values, said plurality of receive RF weighting values and said first and second set of baseband weighting values are computed jointly.

24. In a receiver having a plurality of receive antennas disposed to produce a corresponding plurality of spatially multiplexed received RF signals in response to spatially multiplexed transmitted RF signal energy, said transmitted RF signal energy being comprised of multiple pluralities of subcarrier signals, a signal weighting and combining method comprising:
  receiving said plurality of received RF signals by at least three antennas;
  dividing said plurality of received RF signals received by each antenna into a first receive path and a second receive path of said receiver;
  weighting a first of said divided RF signals of a first antenna with a first RF receive weight, weighting a first of said divided RF signals of a second antenna with a second RF receive weight, weighting a first of said divided RF signals of a third antenna with a third RF receive weight, and combining said first weighted RF signal of said first antenna, said first weighted RF signal of said second antenna and said first weighted RF signal of said third antenna before sending along said first receive path of said receiver;
  weighting a second of said divided RF signals of said first antenna with a fourth RF receive weight, weighting a second of said divided RF signals of said second antenna with a fifth RF receive weight, weighting a second of said divided RF signals of said third antenna with a sixth RF receive weight, and combining said second weighted RF signal of the first antenna, said second weighted RF signal of said second antenna and said second weighted RF signal of said third antenna before sending along said second receive path of said receiver, wherein said RF weighting values of said receiver, RF transmit weighting values of a remote transmitter in communication with said receiver, transmit power scaling factors of said remote transmitter, and coded bit rates of said remote transmitter are jointly determined for each of said plurality of subcarrier signals to maximize an overall data rate of all of said plurality of subcarrier signals, wherein the RF weighting values of said receiver and the RF transmit weighting values of said remote transmitter are modified as frequently as a particular channel changes state.

25. The method of claim 24 wherein each of said multiple pluralities of subcarrier signals comprises an orthogonal frequency division multiplexed signal.

26. The method of claim 24 wherein said spatially multiplexed transmitted RF signal energy is composed of multiple pluralities of RF signals, each of said multiple pluralities of RF signals being weighted by a corresponding plurality of transmit RF weighting values.

27. The method of claim 26 wherein said plurality of transmit and receive RF weighting values are selected from a plurality of sets of weighting values defining a weight space, the method further including calculating said output data rate with respect to each of said plurality of sets of weighting values using multi-user adaptive bit loading.

28. The method of claim 24 further including:
  downconverting said one or more spatially-multiplexed combined RF signals in order to produce a set of baseband signals;
  generating pluralities of baseband subcarrier signals using said set of baseband signals; and
  weighting and combining ones of said baseband subcarrier signals utilizing a first set of baseband weighting values.

29. The method of claim 5 wherein said plurality of RF weighting values and said plurality of bit loading values are adjusted in accordance with changes in a state of said channel.

* * * * *